US006993490B2

(12) United States Patent
Chen et al.

(10) Patent No.: US 6,993,490 B2
(45) Date of Patent: Jan. 31, 2006

(54) METHOD AND APPARATUS FOR NOTIFYING A PARTY OF ANOTHER PARTY'S LOCATION AND ESTIMATED TIME OF ARRIVAL AT A PREDETERMINED DESTINATION

(75) Inventors: Sylvia Yu Chen, Libertyville, IL (US); Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 692 days.

(21) Appl. No.: 09/801,093

(22) Filed: Mar. 7, 2001

(65) Prior Publication Data

US 2002/0128850 A1 Sep. 12, 2002

(51) Int. Cl.
G06F 17/60 (2006.01)

(52) U.S. Cl. .......................................... 705/1
(58) Field of Classification Search .................... 705/1
See application file for complete search history.

(56) References Cited

U.S. PATENT DOCUMENTS

| 4,910,493 | A | | 3/1990 | Chambers et al. |
| 5,255,306 | A | | 10/1993 | Melton et al. |
| 5,461,390 | A | | 10/1995 | Hoshen |
| 5,568,119 | A | | 10/1996 | Schipper et al. |
| 5,731,757 | A | | 3/1998 | Layson, Jr. |
| 5,742,233 | A | | 4/1998 | Hoffman et al. |
| 5,825,283 | A | | 10/1998 | Camhi |
| 5,889,474 | A | | 3/1999 | LaDue |
| 6,006,159 | A | | 12/1999 | Schmier et al. |
| 6,026,375 | A | * | 2/2000 | Hall et al. ................. 705/26 |
| 6,411,891 | B1 | * | 6/2002 | Jones ........................ 701/201 |
| 6,529,136 | B2 | * | 3/2003 | Cao et al. .................. 340/686.1 |
| 6,542,749 | B2 | * | 4/2003 | Tanaka et al. .............. 455/456 |

| 2001/0005171 | A1 | * | 6/2001 | Farringdon et al. ........ 340/573.1 |
| 2002/0042846 | A1 | * | 4/2002 | Bottan et al. .............. 709/249 |

(Continued)

FOREIGN PATENT DOCUMENTS

DE 10040948 A1 * 2/2002

(Continued)

OTHER PUBLICATIONS

Baard, Erik, "Here and now," Chief Executive, n158, PP: 42-29, Aug. 2000.*

(Continued)

Primary Examiner—John G. Weiss
Assistant Examiner—Jonathan Ouellette
(74) Attorney, Agent, or Firm—Hisashi D. Watanabe; Joseph T. Cygan

(57) ABSTRACT

The present invention is a method of coordinating an activity at a destination includes receiving a first signal indicative of a first location of a first party (110). The first signal is received at a destination of the first party. A second signal indicative of a second location of a second party is received at a destination (112), which is also the destination of the second party. A schedule is created (150) to coordinate the activity automatically at the destination. The schedule is based on the first and second signals indicative of the first and second locations and may include additional functions such as the estimated times of arrival of the first and second parties (120, 122). Also, the present invention is a method of notification upon arrival at a predetermined location (200) that includes receiving a first signal indicative of the location of a first party (210). A second signal is transmitted to a second party (230) when the location of the first party is equal to a first predetermined location (220). The activity is coordinated at a second location based on the second signal.

14 Claims, 2 Drawing Sheets

U.S. PATENT DOCUMENTS

2002/0086676 A1 * 7/2002 Hendrey et al. ............ 455/445
2002/0098850 A1 * 7/2002 Akhteruzzaman et al. .. 455/456
2002/0107008 A1 * 8/2002 Hendrey et al. ............ 455/456

FOREIGN PATENT DOCUMENTS

| WO | WO 200062266 | * | 10/2000 |
| WO | WO 200221864 A1 | * | 3/2002 |
| WO | WO 200223507 A2 | * | 3/2002 |

OTHER PUBLICATIONS

Stone, Brad, "Love Online—Millions are turning to the Internet tofind romance. The pursuit can be fruitful—but chemistry is a tricky thing to transmit," Newsweek International, Feb. 19, 2001.*

* cited by examiner

METHOD AND APPARATUS FOR NOTIFYING A PARTY OF ANOTHER PARTY'S LOCATION AND ESTIMATED TIME OF ARRIVAL AT A PREDETERMINED DESTINATION

TECHNICAL FIELD

The present invention relates generally to communication systems, and more particularly to a method and apparatus for notification of a party's location with an estimated time-of-arrival at a particular location.

BACKGROUND OF THE ART

Many times people need to coordinate themselves at a particular location at a certain time. This could be driving to pick up a friend or relative at the airport, processing an order and having the order ready for pickup, meeting a taxi at a reserved time, appearing on time for a speech following the introduction or any other scheduled meeting. Other times, instead of meeting at a specific time, multiple parties agree to a window of time or an approximate time in which they will meet.

However, it is often the case that at least one of parties is late, thereby causing inconvenience to those that are on time. It could also be an inefficient use of time when one party is on time, but another party arrives earlier than expected. Often frustration can result when one party has had to wait for the other. For example, a party may come home every day by a train. While the train is often on time, it is also sometimes early and other times late. The party's spouse has to pick the party up at the train station every day. When the train runs late, the spouse has to sit and wait, perhaps not knowing when the train will arrive. When the train is early, the spouse may not have arrived yet and the party must wait.

In the case of businesses, it is desirable to have a customer-specific order ready and waiting by the time the customer arrives to pick it up. This is especially useful when dealing with numerous customers in a short time span, when the queue is long, upon fulfilling orders that require considerable amounts of time to prepare or when dealing with perishable goods. For example, in a pizza business it is beneficial to both the customer and the business to provide a pizza that is neither cold nor late. In a services-oriented business, such as a doctor's office, it is desirable to know if the customer will be on time for the scheduled appointment and, if not, what time the customer might be there.

Sometimes parties agree to meet during a time window or an approximate time as opposed to a specific time, such as for cable installation or home deliveries. Often this can be a matter of hours. In such a case, the waiting party can spend a good part of the day simply waiting for the other to arrive. It would be beneficial to the waiting party to know with greater accuracy when the cable installer or delivery truck may arrive, or when they are close to arriving.

Known methods of dealing with the above problems are limited to scheduling an appointment and hoping that the parties will be on time. As shown above, however, this is often not the case.

Other known methods involve updating the scheduled time shortly before arriving. This is generally done by calling ahead to let the waiting party know if the arriving party is running early or late, and approximately when the arriving party will be there. Unfortunately, people often forget to call ahead or are unable to call ahead because a phone is not available. Other times, the waiting party may not be near a phone or their phone number is not available. Generally, it is simply inconvenient to do so.

Devices and methods are also known for tracking a party and automatically sending an alert to another party when the first party is not within a certain area. This is often seen in devices and methods for monitoring parolees or individuals under house arrest. However, the two parties are generally not meeting at a predetermined location, especially once the alert sounds. Nor can the device be manually operated by the parolee or arrestee to alert the other party as to where they are and when they might be arriving at a predetermined location. Furthermore, the parolee or individual under house arrest is usually not allowed to program the device to alert different parties, define a predetermined location, define the boundaries of the area, or include personalized messages.

Further methods and devices are known to periodically prompt a party to record a message regarding their location, thus providing another party with the last known location. However, the party could simply ignore this prompt or delay in recording the message only to later forget to record one. Moreover, the location information may be inaccurate due to human error and/or out of date. Such devices and methods do not automatically alert the other party as to the party's position and/or approximate time of arrival at a predetermined location. Instead, an alert is sent manually by way of a panic button.

Methods and devices are also known for notifying passengers of the status of a vehicle or aircraft including its position and approximate arrival times. Vehicle information can be accessed by devices such as telephones, pagers, computers, cellular telephones, personal digital assistants, etc. However, this information is made available to the general public. Individual parties may not want everyone to know where they are and when they are arriving. Also, the information is accessed by a party as opposed to a system that is proactive and contacts the party individually. Furthermore, the status information is directed towards the vehicle and is not personalized to an individual party.

Thus there is a need for a method and apparatus that alerts a party when another party reaches a predetermined location. There is also a need for a device and apparatus that efficiently allows for the coordination of an activity at a party's destination.

DESCRIPTION OF THE PREFERRED EMBODIMENTS

The invention is directed to a method of coordinating an activity at a destination. A first embodiment is a method that includes receiving information regarding the location of a first party and a second party. The location information is used to create a schedule to automatically coordinate the activity at the destination of the first and second parties.

In accordance with another aspect of the present invention, a method of notification upon arrival at a predetermined location is provided. A first party is located at a first location. A signal is transmitted to a second party when the first location is equal to a first predetermined location. This signal is used to coordinate an activity at a second predetermined location.

In accordance with still another aspect of the present invention, a communications system is provided. The communications system includes means for determining a location of a mobile station. The communications system estimates the time of arrival of a mobile station at a predetermined location. Information regarding either the location of the mobile station and/or the estimated time of arrival is then received by means specific to a first party. This information may further allow for coordinating an activity at a predetermined location.

In accordance with yet another aspect of the present invention, a computer program is provided. The computer program has a first routine that locates the positions of one or more parties. A second routine periodically estimates the time of arrival of the one of more parties at a predetermined destination. A third routine schedules an activity based on this estimate.

In accordance with a further aspect of the present invention, a method of doing business is provided. An order is received from a customer. Information regarding the customer's location is received. The location information is used to estimate the time of arrival of the customer, and the order is prepared to coincide with the estimated time of arrival of the customer.

Figure 1:
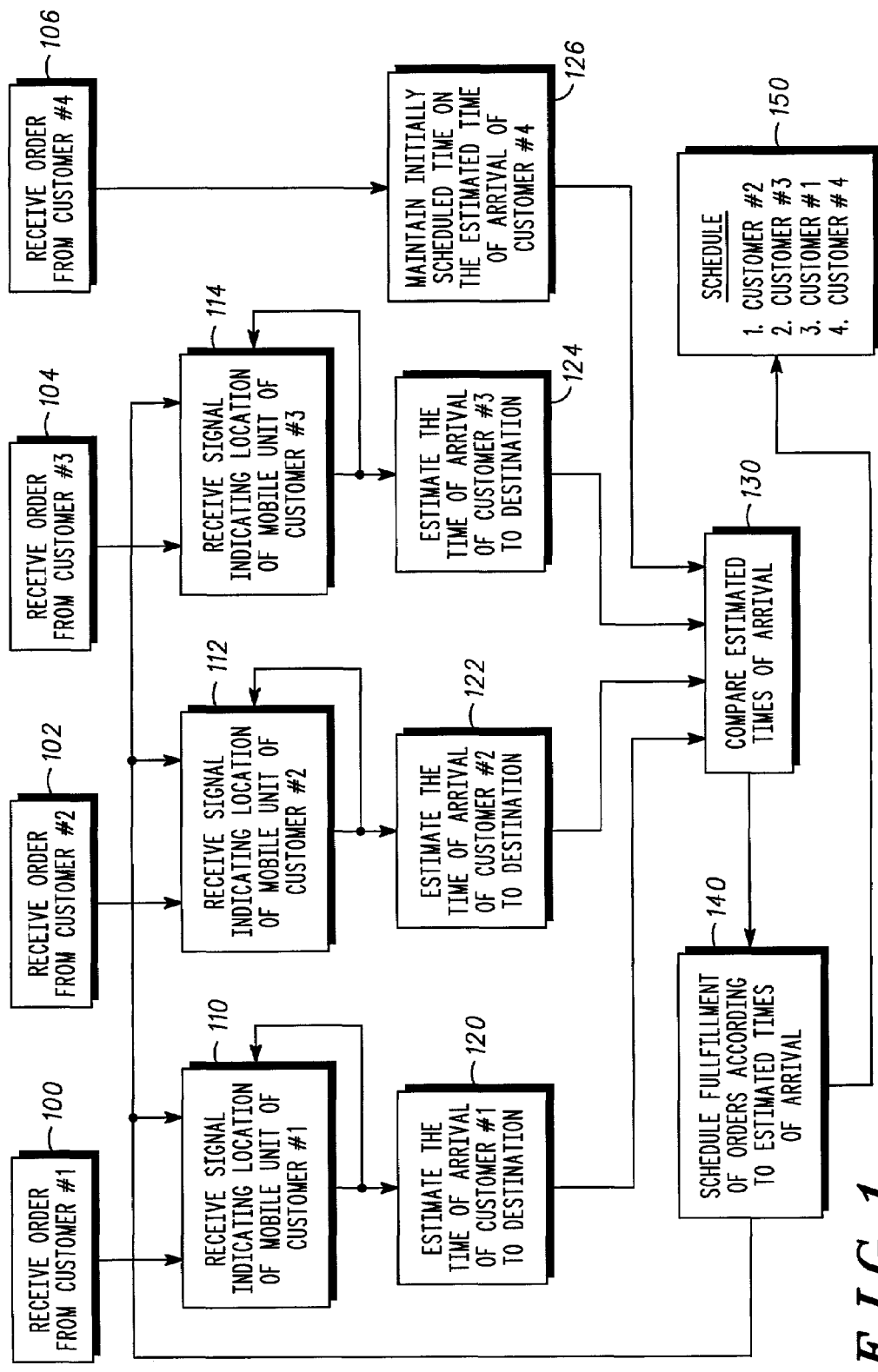
FIG. 1 is a block diagram of a first embodiment of the present invention.

Referring now to FIG. 1, a method of coordinating an activity at a destination among more than one party is shown. The destination may be any kind of location, such as a business, and the activity can be the sale of goods or services by the business. For purposes of explaining an embodiment of the invention, a pharmacy is used as an example. The pharmacy receives orders from a number of customers, shown as Customer #1, Customer #2, Customer #3, and Customer #4. Some of the customers possess a location-enabled, wireless mobile station. This could be a cellular telephone, a portable computer, a personal digital assistant, a pager, a positioning system of the customer's car or any other electronic device that would remain in the general vicinity of the customer and is capable of being located. For the preferred embodiment, a cellular telephone is contemplated. Furthermore, in this example it is assumed that Customer #4 does not possess the disclosed mobile station.

Customers place an order with the pharmacy to fulfill a prescription. The order is made by each customer over the telephone or the Internet, or it may be made by a third party such as a doctor prescribing the prescription. Each order may be different according to the needs of each customer, such as by type and amount. Furthermore, the customer may be given a scheduled time, an earliest time or a time window to pick up the order.

At this point, an association is made with the customer's mobile station for those customers that possess the disclosed device (i.e., Customer #1, Customer #2, and Customer #3). A predefined protocol between the customer's mobile station and the pharmacy would initiate conveyance of the location determination information. When the customer calls in the order, the pharmacy receives a customer identification. For example, the pharmacy may be given the phone number of the cellular phone used by the customer as identification. However, any type of identification unique to the mobile station is suitable, and could be temporarily established for only that particular order. It is possible that the customer could have multiple orders that are to be picked up at various times. Therefore, the identification can be made unique to each particular order. This identification will allow the pharmacy to retrieve location determination information of that particular customer for at least one particular activity.

A communication protocol is then initiated such that the pharmacy can monitor or be notified of the customer's location. The protocol can be Short Message Service (SMS), Enhanced Message Service (EMS), Multimedia Message Service (MMS), Wireless Application Protocol (WAP), Java or any other suitable network communication protocol. The pharmacy may then access information about or be notified of the customer's location. For example, the pharmacy may be given a temporary password to access a specific site on the Internet which may only be accessed at a certain time. For example, if the customer makes the order on Monday and is scheduled to pick it up on Friday afternoon, the pharmacy may only be allowed access to the site beginning on Friday morning until the order is picked up. This site notifies the pharmacy of the customer's location, and could be continually updated on a substantially real-time basis. Alternatively, the pharmacy may be notified simply of the customer's estimated time-of-arrival, as discussed below.

In the present embodiment, each of Customer #1, Customer #2, Customer #3 and Customer #4 has a prescription order specific to them. All four orders have been made with the same pharmacy. Thus all four customers have the same destination. After the order has been placed at steps 100, 102, 104, and 106 for each respective customer, the method receives a signal indicating the location of each mobile station of Customer #1, Customer #2 and Customer #3 at steps 110, 112 and 114 respectively. The method does not receive a signal indicating the location of Customer #4, because Customer #4 does not possess the disclosed mobile station. The method of locating each customer with the disclosed device may be performed through a global positioning system, triangulation methods, pilot measurements as used in Code Division Multiple Access cellular systems, radio frequency signature patterns, center-of-mass predictions or any other suitable means of determining the location of the mobile station and hence the customer.

The location determination of each customer may be either automatic or under the control of the individual customer such that the customer can manually trigger the method to locate the customer's mobile station and provide the pharmacy with the location information signal. The customer may also authorize and program the signal that will be sent regarding the customer's location. The signal itself may be in the form of a text message, an audio message, a video message or other data transmissions. Furthermore, the steps of locating the mobile station 110, 112 and 114 may each be done continuously or periodically to provide updates for each customer's location. The results of steps 110, 112 and 114 can then be provided to a central computer system having a computer processor and memory. This could be at the pharmacy itself or at a location central to several pharmacies, such that each pharmacy has access or the central computer calculates which pharmacy the customer will likely go to for his order. This would be especially useful for commonly-owned stores and retail chains.

Once the location of the mobile station, and hence the customer, is established the method performs an estimation at steps 120, 122 and 124 of when each customer will arrive at the pharmacy. For example, the time-of-arrival estimation of Customer #1 may be done by comparing two location measurements from step 110. By comparing the distance traveled to the difference in time between the two location measurements, it is possible to determine Customer #1's rate of speed and thus estimate when Customer #1 will arrive at the pharmacy, assuming the same rate of speed is maintained. Other methods of estimating the customer's timeof-arrival are possible, including using known services that predict travel times, such as on-line driving directions. This program would estimate the time it takes to drive from the customer's location to the pharmacy. More sophisticated systems may be able to take into account reported traffic conditions, such as congestion, weather, construction or any other factor that may generally affect the customer's travel time. Again, this step is not done for Customer #4 who is without the disclosed mobile station and cannot be located. Therefore, the system retains the scheduled time, earliest time or time window initially established as the estimated time of arrival as indicated at step 126.

Once the estimated time-of-arrival is calculated for each of Customer #1, Customer #2 and Customer #3, the three estimates are compared at step 130 to determine which customer will probably arrive first, which will probably arrive second, which will probably arrive third, and which will probably arrive fourth. The results of this can be used at step 140 to automatically schedule which order should be prepared and fulfilled first, which should be prepared second, which should be prepared third, and which should be prepared fourth. Additional considerations that affect the time of preparing and fulfilling the order may also be taken into account such as the size and complexity of the order. For example, an ingredient may need to be added at a certain time. If the ingredient is added too early, the order may be unsatisfactory when the customer arrives. If added too late, the order may not be ready when the customer arrives. Therefore, the process of preparing and fulfilling the order needs to be adapted to accommodate the customer's arrival. This step can generally be done by the central computer system.

At step 150, the pharmacy is provided with an order fulfillment schedule. The contents of the schedule can be based on just the estimated times-of-arrival such that the parties preparing the order may use their own judgment and determine the order in which to prepare and fulfill the prescriptions. Alternatively, the computer may be used to suggest the order in which each prescription should be prepared or at what time preparation of the order should begin and if the timing of the preparation needs to be adapted.

The scheduling process performed at step 140 may be continuously and automatically updated to provide a dynamic schedule at step 150. If the location determination of the customer is performed continuously, the estimate of when the customer will arrive is continually updated. Since this is done for each customer in the queue, with the exception of Customer #4, the pharmacy is able to adjust the preparation and fulfillment of each order according to changes in arrival times or based on the preparation requirements of the order. For example, Customer #1 may place the first order, Customer #2 may place the second order, Customer #3 may place the third order, and Customer #4 may place the fourth order. The schedule may begin with the order of Customer #1 to be prepared and fulfilled first, the order of Customer #2 prepared second, the order of Customer #3 third, and the order of Customer #4 fourth. Each of the customers may also have a corresponding scheduled time to pick up their order. However, it may happen that Customer #1 ends up running late. Her location is determined and the estimated time-of-arrival determines that Customer #1 will not be on-time for her scheduled pick-up time. In fact, her estimated time-of-arrival and comparison at step 130 determines that she will most likely arrive after Customer #2 and before Customer #4.

Meanwhile, the method determines that Customer #3 is running ahead of schedule and predicts that he will be at the pharmacy to pick up his prescription before Customer #1 will arrive to pick up her prescription. Therefore, the system moves Customer #3 ahead of Customer #1, so that Customer #3's prescription will be completed before Customer #1's prescription. Customer #4's initially scheduled time is still later than the estimated times-of-arrival of the other three, so he remains last on the schedule, with his order to be completed according to his initially scheduled pick-up time. This is the case even if Customer #4 arrives early or late.

Alternatively, Customer #3's prescription may require more time to prepare. The schedule may then inform the pharmacy that based on Customer #3's estimated time-of-arrival, the preparation of the prescription should begin before Customer #2's order which requires less time to prepare. The schedule may also inform the pharmacy that Customer #3's prescription requires an ingredient that should be added only shortly before Customer #3's arrival. In this sense, the process of preparing and fulfilling a customer's order may be adapted based on the customer's location and estimated time-of-arrival.

The order is then ready when the customer arrives to pick up the prescription. Not only is the customer's time used efficiently, but the time of the person(s) preparing the order has been used efficiently. Neither party has had to wait or hurry due to the other. The process may be made even more time-efficient when the payment is done electronically, such as over the phone, over the Internet or through a mobile station upon arrival of the customer to pick up the order. The customer may then simply arrive, authorize payment via the mobile station if necessary, pick up the order and drive away. Payment may be made in full beforehand, or the payment may not be processed until the customer receives the order.

Figure 2:
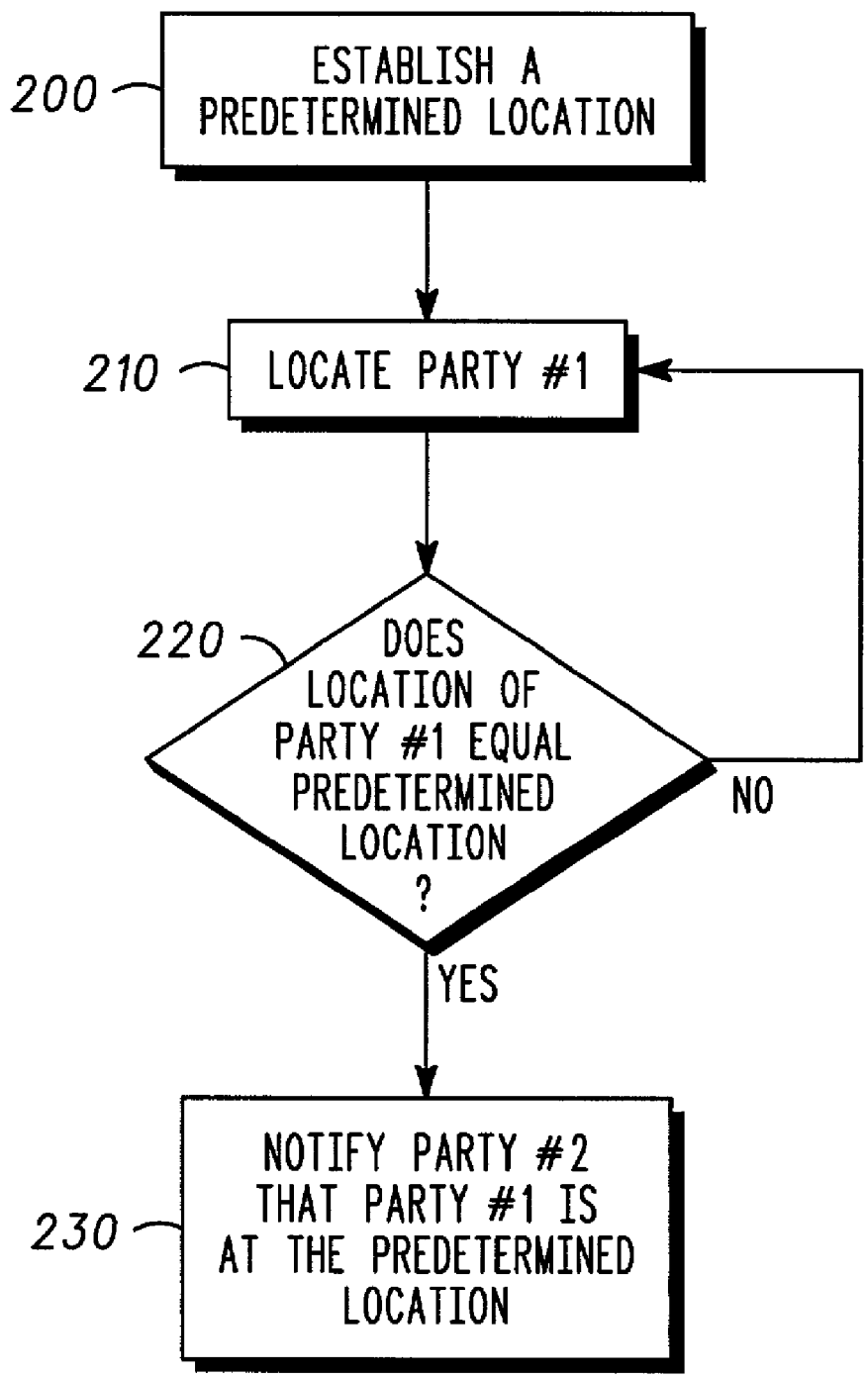
FIG. 2 is a block diagram of a second embodiment of the present invention.

FIG. 2 is a flow chart of a further embodiment of the present invention in which the system is programmed by the user to notify another party when the user reaches a predetermined location as indicated at step 200. Party #1 and Party #2 have agreed to meet at a predetermined destination. Party #1 is carrying a location-enabled mobile station as described above. At step 210, Party #1 is located. The location of Party #1 is compared with a predetermined location at step 220. The predetermined location is essentially a threshold condition that can be specified by Party #1. This threshold could be either a specific location such as a street address, an intersection, a defined area such as a city block or a threshold distance such as a few miles from the predetermined destination or within a certain radius of Party #2. If the location of Party #1 does not equal the predetermined location, the method continues to determine and update the location of Party #1, and compare the location to the predetermined location.

When the location determination of Party #1 is equal to that of the predetermined location, Party #1 has arrived at the predetermined location or crossed the specified threshold. This triggers a signal at step 230 that is sent to Party #2 as notification that Party #1 is at the predetermined location. The predetermined location may be the predetermined destination. Alternatively, it may simply be an indication that Party #1 is only a few minutes from arriving at the predetermined destination. This can be done automatically over a telecommunications system such as the phone lines, or over a data communications system such as the Internet or email. This signal may also be sent only if manually triggered by Party #1.

The signal itself may be as simple as a flashing light, a sound or a vibration, such as on a personal pager. The signal may also be more complex such as a prerecorded or preprogrammed message in the form of text, video or audio. Party #2 may receive this signal over different kinds of equipment such as a landline telephone, a cellular phone, a computer, a pager, a personal digital assistant, video display or other suitable equipment capable of receiving a signal over a communications system.

The location of Party #1 can be updated and provided to Party #2 as described above with reference to FIG. 1. Furthermore, the method may calculate the approximate time that Party #1 will arrive at the predetermined destination, as described above. This too can be provided to Party #2 in the form of a simple noise, light or vibration, a preprogrammed text message, a preprogrammed audio message or a preprogrammed video message.

This method is also applicable to situations where one party has to wait during a window of time for the other party to arrive. For example, home deliveries or cable installation often do not give a specific time of arrival, but rather only a window of time during which they will arrive. This could be a matter of hours. Using the above method, the waiting party could be notified when the delivery truck is finishing a delivery immediately preceding the delivery to the waiting party, or when the cable installer is finishing the appointment immediately preceding the appointment for the waiting party. The estimated time of arrival could also be determined, as discussed above.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A method of coordinating an activity at a destination of a first party and a second party comprising the steps of:
   receiving a first signal indicative or a location of the first party, wherein the first signal is received at a central scheduling computer;
   receiving a second signal indicative of a location of the second party, wherein the second signal is received at the central scheduling computer; and
   creating a schedule to coordinate an activity automatically at the destination based at least in part on the first and second signals.

2. The method of claim 1 further comprising the steps of:
   receiving at the central scheduling computer an update of the location of the first party; and
   updating the schedule automatically based on the update of the location of the first party.

3. The method of claim 1 further comprising the step of estimating a time of arrival for at least one of the first party and the second party at the destination to provide estimates.

4. The method of claim 3 further comprising the step of updating at least one of the estimated time of arrival of the first party and the estimated time of arrival of the second party.

5. The method of claim 1, wherein at least one of the first and second signals are one of a preprogrammed audio message, a preprogrammed video message and a preprogrammed text message.

6. The method of claim 1, wherein at least one of the first signal and the second signal is transmitted in response to a manual action by at least one of the first party and the second party respectively.

7. A method of notification upon arrival at a predetermined location comprising the steps of:
   receiving a first signal indicative of a first location of a first party;
   transmitting a second signal to a second party when the first location is equal to a first predetermined location; and
   coordinating an activity at a second predetermined location based on the second signal.

8. The method of claim 7, further comprising the step of locating the first party to provide the first location.

9. The method of claim 7, wherein the step of transmitting the second signal is triggered automatically.

10. The method of claim 7, wherein the step of transmitting the second signal is triggered manually by the first party.

11. The method of claim 7, wherein the second signal is one of a preprogrammed audio message, a preprogrammed video message and a preprogrammed text message.

12. The method of claim 7, wherein the second signal is programmed by the first party.

13. The method of claim 7, wherein the first predetermined location is one of an address, an intersection, a threshold distance and a defined area.

14. The method of claim 7, wherein the second signal is specific only to the first party.

* * * * *